United States Patent [19]

Ushimura

[11] 4,373,498

[45] Feb. 15, 1983

[54] EXHAUST GAS RECIRCULATION SYSTEM FOR INTERNAL COMBUSTION ENGINE

[75] Inventor: Shoji Ushimura, Yokosuka, Japan

[73] Assignee: Nissan Motor Company, Limited, Kanagawa, Japan

[21] Appl. No.: 151,574

[22] Filed: May 20, 1980

[30] Foreign Application Priority Data

May 22, 1979 [JP] Japan ................................ 54-62269

[51] Int. Cl.$^3$ ........................................ F02M 25/06

[52] U.S. Cl. .................................. 123/571; 123/568

[58] Field of Search ....................... 123/571, 568, 569

[56] References Cited

U.S. PATENT DOCUMENTS 3,703,164 11/1972 Weaving ............................ 123/568

4,276,865 7/1981 Hamai ................................ 123/571

FOREIGN PATENT DOCUMENTS 2525585 2/1976 Fed. Rep. of Germany .

2628058 5/1978 Fed. Rep. of Germany ...... 123/571

2750537 11/1979 Fed. Rep. of Germany .

*Primary Examiner*—Wendell E. Burns

*Attorney, Agent, or Firm*—Lowe, King, Price & Becker

[57] ABSTRACT

An impeller is disposed in an exhaust gas recirculation passage communicating between the exhaust passage and the intake passage of the engine. The impeller supplies part of the exhaust gas positively from the exhaust passage to the intake passage of the engine. The blowing device includes a blower which is driven electrically or mechanically.

3 Claims, 3 Drawing Figures

EXHAUST GAS RECIRCULATION SYSTEM FOR INTERNAL COMBUSTION ENGINE

BACKGROUND OF THE INVENTION

1. Field of the Invention

The present invention relates to an internal combustion engine, such as a diesel engine, of a type in which fuel is injected into the cylinders, and more particularly relates to an exhaust gas recirculation system therefor.

2. Description of the Prior Art

An exhaust gas recirculation system for an internal combustion engine is provided with an exhaust gas recirculation (referred to hereinafter as EGR) passage which communicates between the exhaust passage and the intake passage of the engine. A differential in presure occurring between the exhaust passage and the intake passage recirculates part of the exhaust gas to the intake passage. This pressure differential is usually produced by a throttle valve provided at a point in the intake passage. The opening amount of the throttle valve is changed according to the operating state of the engine, and this changes the intake vacuum to which the EGR passage opens, thereby producing a pressure differential along the EGR passage which controls the amount of EGR.

Since the throttle valve provided in the intake system controls the amount of EGR in such a prior art system, however, the flow of intake air is necessarily always somewhat throttled. This impairs the advantage that the puming loss is small in an engine in which fuel is injected. Further, the amount of flow of intake air into the engine is decreased, which deteriorates the burning of fuel within the engine. This may increase the amount of discharged unburnt hydrocarbons and smoke emissions, or decrease the power output of the engine whereby deteriorating proper engine operation. However, since it was absolutely necessary to recirculate exhaust gases, use of the throttle valve could not be avoided.

SUMMARY OF THE INVENTION

The present invention provides an exhaust gas recirculation system for an internal combustion engine comprising an intake passage and an exhaust passage, said system comprising a recirculation passage communicating between the exhaust passage and the intake passage; and means disposed in the recirculation passage for impelling exhaust gas from the exhaust passage of the engine to the intake passage along the recirculation passage.

This eliminates the need to provide a throttle means in the intake passage, and the required amount of intake air is thus ensured in spite of EGR. Thus incomplete burning of fuel is reduced, unburnt hydrocarbon and smoke emissions are decreased, and deterioration of operating efficiency of the engine and low fuel consumption are hindered. Since the impelling means supplies the exhaust gas positively at a certain pressure, the resistance inherent in the EGR system does not affect the EGR amount so much, thereby bringing about stable EGR control.

The EGR according to the present invention does not substantially utilize the pressure differential between the intake passage and the exhaust passage, as in the prior art. Thus the exhaust gas recirculated can be taken out from any portion of the exhaust passage. The exhaust gas taking out port can thus be provided at the most convenient position from the standpoint of layout of the automotive vehicle. From the same standpoint, the feed port for exhaust gas recirculated to the intake passage can be provided as divided into a plurality of smaller passages which are connected to various branches of the intake manifold. This improves the distribution of the recirculated exhaust gas to the various combustion chambers, thereby stabilizing the burning of the fuel and providing stable operation of the engine.

BRIEF DESCRIPTION OF THE DRAWINGS

Other features and advantages of the present invention will be apparent from the following description, taken in conjunction with the accompanying drawings which are given by way of illustration only and which are not intended to be limitative. In the drawings.

DETAILED DESCRIPTION OF THE PREFERRED EMBODIMENT AND MODIFICATIONS

Figure 1:
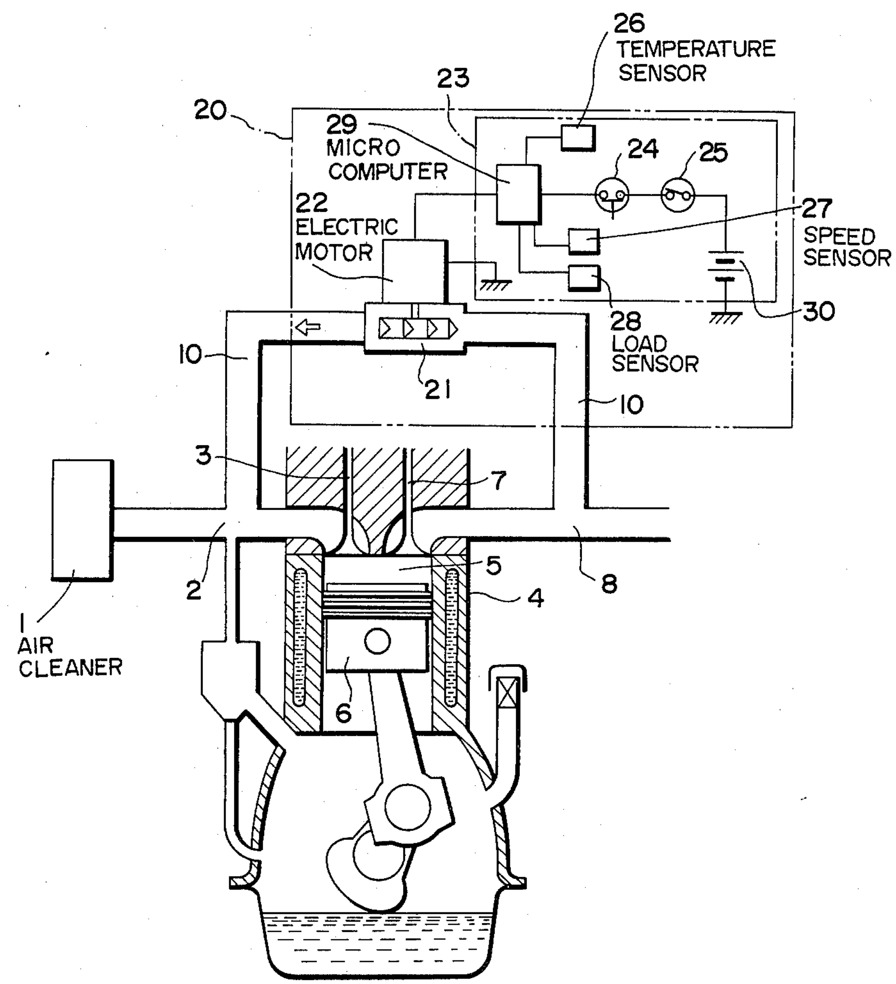
FIG. 1 is a schematic view of a preferred embodiment of the EGR device according to the present invention.

The same reference numeral denotes corresponding elements throughout the drawings in the respective embodiment and modifications of the present invention.

Referring to FIG. 1, a first preferred embodiment of the EGR system according to the present invention is shown. Air is drawn past an air cleaner 1, an intake passage 2, and an intake valve 3 into a combustion chamber 5 of an internal combustion engine 4 of the type in which fuel is injected into the cylinders (in this particular embodiment, a diesel engine). The air, and fuel injected from a fuel injection valve (not shown), form a gas mixture, which is compressed and ignited by the compressing operation of a piston 6, and which burns to produce a power output. The exhaust gas produced after burning is vented into the atmosphere past an exhaust valve 7, through an exhaust gas passage 8 and, and as may be desired, through a gas treatment device, located downstream of the exhaust gas passage 8, and not shown.

The present invention involves the concept that the intake passage 2 is provided with no throttle means therein for EGR, contrary to the case with prior art devices.

The exhaust passage 8 and the intake passage 2 are communicated via an EGR passage 10, and therein is provided an exhaust gas impelling device 20. The EGR passage 10 can be connected to the main passage of the intake manifold, not shown, as is the case with prior art devices, or can be divided at its outlet end so as to be connected to various branches of the manifold.

The impelling device 20 controls the amount of EGR passing along the EGR passage 10, depending on the operational state of the engine. In more detail, the impelling device 20 may include a blower (in this embodiment) or a compressor 21 disposed in the EGR passages 10 and which includes, an electric motor 22 which drives the impeller 21, and a controller 23 which controls the output of the motor 22. The controller 23 includes an oil pressure switch 24 which senses the oil pressure within the engine, a start switch 25 which detects the starting of the engine, and an electric power supply 30 which can be connected in series with a microcomputer 29. The controller further includes a temperature sensor 26 which senses the engine temperature from the temperature of the cooling water for the engine, a speed sensor 27 which senses the rotational speed of the crankshaft (not shown), a load sensor 28 which senses the load exerted on the engine from the amount of depression of the accelerator pedal, or the angle of inclination of the control lever of the fuel injection pump, not shown. The microcomputer 29 receives data from the various sensors and calculates a parameter for control of the motor 22 so that the EGR blower 21 provides an amount of EGR optimal for the operational state of the engine at the current time.

In operation, when the start switch 25 is switched on and the engine starts, the hydraulic oil pressure in the engine increases, which is sensed by the oil pressure switch 24. This operates the electric motor 22 through the microcomputer 29.

Thus the blower or compressor 21 serves to positively blow part of the exhaust gas in the exhaust passage 8 through the EGR passage 10 into the intake passage 2 and thus into the combustion chamber 5. This suppresses an excessive rise in temperature in the combustion chamber 5 and therefore reduces production of $NO_x$.

The microcomputer 29 receives data representing the operational state of the engine from the various sensors 26 to 28, and calculates from the data an electrical signal representing an optimal amount of EGR. The electrical signal is used for controlling the output of the motor 22 and therefore controls the amount of EGR provided by the impeller 21 to an optimal value, which eliminates the need to provide a special throttle valve in the intake passage 2. The device illustrated in FIG. 1 is advantageously applicable to an electronically controlled fuel injection engine.

As sensors which sense the operational state of the engine, other well known sensors than those mentioned above may be used. The number and kind of sensors used is a question of design choice.

Figure 2:
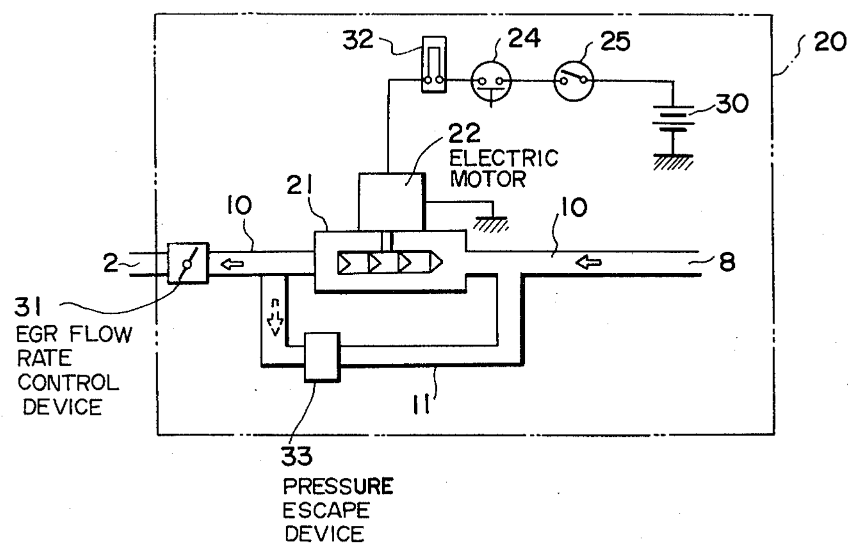
FIG. 2 is a modification of the exhaust gas impelling device of FIG. 1.

In FIG. 2 is shown a modificatiion of the embodiment shown in FIG. 1. In the FIG. 1 embodiment, the impeller 21 controlled the amount of EGR depending upon the operational state of the engine, under control of the controller 23. On the other hand, the modification of FIG. 2 discloses an exhaust gas impeller 21 which rotates at a substantially constant speed, i.e. the amount of EGR flow therethrough is substantially constant. As an alternative, the impeller could be driven by a rotating part of the engine (for example, the crankshaft or camshaft), according to the rotational speed of the engine. The electric motor 22, in this modification, is driven at a constant rotational speed by the series connected drive circuit of the power supply 30, the starter switch 25, the hydraulic switch 24, and a water temperature switch 32, so that the gas flow produced by the rotation of the impeller 21 is substantially constant. In this particular modification, an EGR amount control device such as a throttle valve 31 is provided in the EGR passage 10 downstream of the impeller 21. The throttle valve 31 is controlled in unison with movement of an accelerator pedal or of a fuel control lever of a fuel injection pump, neither of which is shown, thereby controlling the EGR amount fed to the intake passage 2 according to the amount of fuel injection, i.e. according to the engine load.

The excess part of the gas passing through the impeller 21 is returned to the entrance of the impeller 21 through an EGR return passage 11 which communicates between the outlet and the inlet of the EGR impeller 21 and in which is provided a pressure escape device such as a pressure escape valve or orifice 33. Alternatively, the EGR flow rate control device 31 could be provided in the EGR return passage 11 instead of downstream thereof in the EGR passage 10. Consequently, although the electric motor 22 is rotated at a constant speed so as to provide a constant flow rate of gas, the motor is not overloaded when the actual amount of exhaust gas recirculated to the intake passage 2 is low. In the alternative embodiment, when the EGR impeller 21 is driven by a rotating shaft which is in turn driven by the engine, the amount of EGR controlled is affected by the rotating speed of and the load exerted on the engine.

Figure 3:
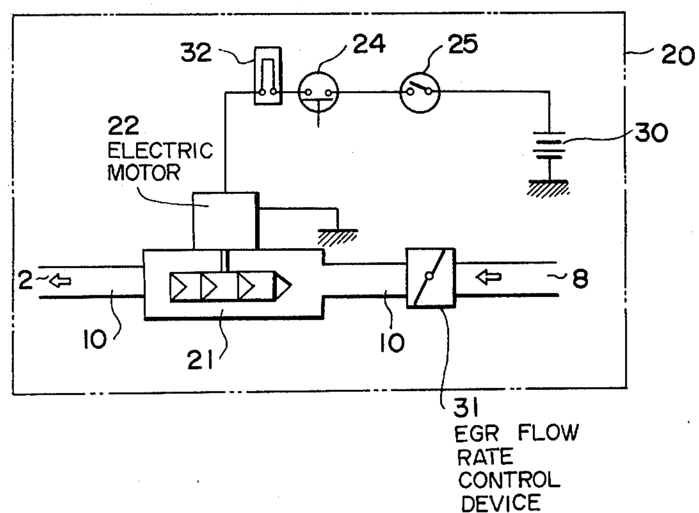
FIG. 3 is another modification of the impeller device.

On the other hand, if the EGR flow rate control device 31 is provided upstream of the EGR impeller 21 in the EGR passage 10, as shown in FIG. 3, the density of the recirculated exhaust gas decreases by the amount of EGR intercepted by the EGR flow rate control device 31. Thus the load on the motor 22 exerted by the impeller 21 disposed downstream of the control device 31 is reduced.

The temperature switch 32 connected in series in the drive circuit for the electric motor 22, as shown in FIGS. 2 and 3, is open when the cooling water temperature is relatively low, and thus the motor 22 is at rest. This stops EGR in this condition, and ensures satisfactory engine operation.

The EGR flow rate control device 31 in FIGS. 2 and 3 may be electrically controlled by a control device such as the control device 23 in FIG. 1.

While the present invention has been particularly shown and described with reference to preferred embodiments thereof, it will be understood by those skilled in the art that the foregoing and other changes in form and details may be made therein without departing from the spirit and scope of the present invention.

What is claimed is:

1. An exhaust gas recirculation system for an internal combustion engine comprising an intake passage and an exhaust passage, said system comprising:

a recirculation passage communicating between the exhaust passage and the intake passage; and means disposed in the recirculation passage for impelling exhaust gas from the exhaust passage of the engine to the intake passage along the recirculation passage, said impelling means including a blower or compressor for forcing a flow of exhaust gas, an electric motor for driving the blower or compressor, and means for controlling the motor.

2. The exhaust gas recirculation device of claim 1, wherein the controlling means comprises a sensor for sensing the operational state of the engine, and means for calculating an optimal output for the motor.

3. An exhaust gas recirculation system for an internal combustion engine having an intake passage and an exhaust passage, said system comprising:

a recirculation passage communicating between the exhaust passage and the intake passage; and means disposed in the recirculation passage for impelling exhaust gas from the exhaust passage of of the engine to the intake passage along the recirculation passage, said impelling means comprising:

a blower or compressor for forcing a flow of exhaust gas, an electric motor for driving the blower or compressor, and means for driving the motor, said driving means being responsive to an operational state of the engine and including an electric power supply and switching means for connecting the power supply to the motor and for disconnecting the power supply from the motor.

* * * * *